(12) United States Patent
Gunther et al.

(10) Patent No.: US 7,821,948 B2
(45) Date of Patent: Oct. 26, 2010

(54) NETWORK MANAGEMENT SYSTEM AND METHOD PROVISIONING OAM SUPPORT FOR MULTICAST COMMUNICATIONS SESSIONS

(75) Inventors: Brian Wilfred Gunther, Stittsville (CA); Dan Renaud, Ottawa (CA); Michael Nicholas Tofinetti, Kanata (CA); Mohammad Farook, Ottawa (CA)

(73) Assignee: Alcatel Lucent, Paris (FR)

( * ) Notice: Subject to any disclaimer, the term of this patent is extended or adjusted under 35 U.S.C. 154(b) by 1270 days.

(21) Appl. No.: 10/854,272

(22) Filed: May 27, 2004

(65) Prior Publication Data

US 2005/0276227 A1 Dec. 15, 2005

(51) Int. Cl.
*H04L 1/00* (2006.01)
*H04L 12/28* (2006.01)
*H04J 3/26* (2006.01)
*H04J 3/24* (2006.01)

(52) U.S. Cl. ............... 370/241.1; 370/390; 370/432; 370/473

(58) Field of Classification Search ............ 370/236, 370/236.1, 236.2, 241, 254, 248, 252, 270, 370/390, 432, 230.1, 230, 229, 241.1, 242–245, 370/250, 465, 470–473; 709/238, 220–229, 709/242, 244
See application file for complete search history.

(56) References Cited

U.S. PATENT DOCUMENTS

| | | | |
|---|---|---|---|
| 6,222,820 B1 * | 4/2001 | Hamami | 370/218 |
| 6,343,326 B2 * | 1/2002 | Acharya et al. | 709/238 |
| 6,556,544 B1 * | 4/2003 | Lee | 370/256 |
| 6,563,795 B1 * | 5/2003 | Gruber et al. | 370/248 |
| 6,894,977 B1 * | 5/2005 | Vallee | 370/236.2 |
| 6,931,005 B1 * | 8/2005 | Wilhelm | 370/390 |
| 6,950,432 B2 * | 9/2005 | Chen et al. | 370/390 |
| 6,992,978 B1 * | 1/2006 | Humblet et al. | 370/228 |
| 7,330,437 B1 * | 2/2008 | Gupta et al. | 370/241.1 |
| 2002/0143951 A1 * | 10/2002 | Khan et al. | 709/227 |
| 2004/0193728 A1 * | 9/2004 | Doshi et al. | 709/238 |

* cited by examiner

*Primary Examiner*—Aung S Moe
*Assistant Examiner*—Redentor M Pasia
(74) *Attorney, Agent, or Firm*—Kramer & Amado P.C.

(57) ABSTRACT

A method for monitoring a point-to-multipoint unidirectional multicast connection via exchange of OAM messages is presented. The method includes retrieving the connection record of the multicast connection from a network management system repository and determining common parent path points between the root and a selected path branch endpoint. In turning on content conveyance monitoring for a termination other than the root, the termination specific uncommon portion of the transport path is segmented if necessary, OAM compliant managed path segments are identified, and OAM configuration commands to turn on OAM functionality are issued only to uncommon path segment endpoints. In turning off content conveyance monitoring for a termination other than the root, a single OAM configuration command to turn off OAM functionality is issued only for the path branch endpoint, or if the uncommon portion of the transport path associated with the no longer participating termination is segmented, OAM configuration commands to turn off OAM functionality are issued only to uncommon path segment endpoints. Advantages are derived from a centralized multicast connection that is configurable in real-time, and reduced signaling overhead as OAM configuration commands are sent only to relevant uncommon managed path segment endpoints as needed.

8 Claims, 4 Drawing Sheets

US 7,821,948 B2

NETWORK MANAGEMENT SYSTEM AND METHOD PROVISIONING OAM SUPPORT FOR MULTICAST COMMUNICATIONS SESSIONS

RELATED APPLICATIONS

This patent application is related to co-pending U.S. patent application Ser. No. 09/624,756 entitled "Network Management Support for OAM Functionality and Method Therefore" filed Jul. 24, 2000 by Nijemcevic et al. which is incorporated herein by reference.

FIELD OF THE INVENTION

The invention relates to monitoring communications sessions provisioned over a packet-switched communications infrastructure, and in particular to a network management system adapted for, and methods of, provisioning Operations, Administration, and Management (OAM) support for multicast communications sessions.

BACKGROUND OF THE INVENTION

Operation, Administration, and Management (OAM) messages have been proposed for use in provisioning communications sessions over communications networks for various diagnostic purposes. Proposed OAM functionality includes: OAM continuity checking used to determine whether transmitted content traverses the transport path of a connection; and also includes OAM performance monitoring which provides for the collection and maintenance of statistical information regarding a particular transport path of a monitored connection. Depending on implementation, OAM Continuity Checking functionality is enabled via the exchange of OAM-CC messages, and OAM Performance Monitoring functionality is enabled via the exchange of OAM-PM messages. Depending on the underlying transport technology of the communications infrastructure, OAM messages are encapsulated in packets, cells, frames, etc. For example, OAM-CC and OAM-PM cells are employed in providing OAM functionality over an Asynchronous Transfer Mode (ATM) communications network infrastructure.

AM functionality has been proposed and codified by standards bodies such as the ATM Forum, in respect of content transport technologies such as ATM. OAM functionality has also been proposed for MultiProtocol Label Switching (MPLS), Frame Relay (RF), etc. content transport technologies. OAM messages are conveyed in-band together with the traffic content conveyed along the transport path of the monitored connection.

Current implementations of OAM functionality include communications OAM compliant network nodes and/or interface cards which can be configured to provision OAM functionality. Prior art implementations include, required, lengthy, mundane, and error prone manual configuration of each communications network node, and manual configuration of each relevant interface card associated therewith, on an individual basis, in order to provision OAM message generation and diagnostic information collection on a per connection basis. Manual configuration includes configuring a particular OAM functionality compliant interface card to act as an OAM message source, as well configuring a corresponding OAM functionality compliant interface card to act as an OAM message sink. OAM message sources generate and inject OAM messages into the content flow conveyed in respect of a monitored connection over a communications content transport infrastructure. OAM message sinks inspect the content flow of a specific monitored connection to extract OAM messages conveyed therein.

Standard OAM functionality specifications assume full compliant adoption thereof. Therefore in prior art implementations, OAM functionality is only supported when both endpoints of the transport path are OAM functionality compliant interface cards. Depending on implementation, the network nodes associated with the endpoint interface cards may also have to support OAM functionality. Furthermore, in order for such prior art solutions to provide OAM functionality, the entire path over which OAM messages are to be conveyed should be homogenous, in the sense that, the communications network infrastructure traversed by the transport path cannot contain Inter-Carrier Interfaces (ICI), because ICI interfaces terminate OAM messages.

FIG. 1 shows an exemplary prior art homogeneous infrastructure 100 over which bi-directional OAM-CC/PM functionality is provisioned in respect of a unicast bi-directional monitored connection between endpoint interface card 102A of network node 104A and endpoint interface card 102B of network node 104B. The transport path of the monitored connection traverses intermediary network nodes 104$i$1, 104$i$2, and 104$i$3. Each intermediary interface card 102$i$ is an Interworking Service Interface (ISSI) forwarding OAM messages along the transport path. Interface card 102 configuration as an OAM message source is depicted as a square with an arrow pointing away from the square; interface card 102 configuration as an OAM message sink is depicted as a square with an arrow pointing toward the square; and interface cards 102 forwarding OAM messages between the OAM message source and the OAM message sink are depicted as a slash and an arrow pointing towards the OAM message sink. In order to provide bidirectional OAM functionality for the bi-directional connection, endpoint interface card 102A is configured as a OAM message source for monitoring content conveyed in the A-to-B direction, and as a OAM message sink for monitoring content conveyed in the B-to-A direction. The endpoint interface card 102B has an opposite configuration. Typically, in accordance with prior art implementations, OAM reports are available for manual download from the end network nodes 104A and 104B respectively.

Although OAM functionality is standardized, not all deployed communication network node and interface card equipment supports OAM functionality. Co-pending U.S. patent application Ser. No. 09/624,756 entitled "Network Management Support for OAM Functionality and Method Therefore" filed Jul. 24, 2000 by Nijemcevic et al., which is incorporated herein by reference, describes a network manager and a method for provisioning OAM functionality for unicast bi-directional connections provisioned over an inhomogeneous infrastructure.

Making reference to FIG. 2, a network management system 210 retrieves 212, from a network management system repository 214, OAM configuration information, held for example in a connection record, specifying an established transport path in terms of a sequence of path points: a source interface, at least one intermediary interface, and a destination interface. The network management system 210 analyzes 216 the OAM configuration information retrieved. For each path point, the network management system 210 determines, based on the configuration of the communications network 200, if the path point is to serve as an OAM message source or sink in respect of the monitored connection. The network management system 210 generates OAM configuration commands for the selected path points that are to serve as OAM message sources and sinks, and the OAM configuration commands are issued 218 to the appropriate OAM message source and sink points for execution. Intermediary path points 202iB and 202iA represent segment endpoints to which OAM configuration commands are issued to turn OAM functionality on or off in monitoring the connection.

The centralized OAM functionality provisioning reduces the lengthy, mundane, and error prone manual configuration of interface cards in the transport path of provisioned connections in monitoring thereof, as well provides for central collection of OAM reports. If the network management system 210 determines that a fault or other critical condition is present within the communications network 200 which results in a reroute condition that affects a transport path of the monitored connection, the network management system 210 autonomously reconfigures the OAM message sources and sinks for the transport path to ensure that OAM functionality for the monitored connection is maintained. Furthermore, the network management system 210 can also generate additional OAM message source and sink point configuring commands issued to isolate a particular fault through the use of OAM continuity checking. The network management system 210 combines OAM configuration information and OAM reports with communications network infrastructure information stored in the network management system repository 212 for display to operations management personnel interacting therewith.

Network management system control of OAM setup and configuration within the managed communications network 200 provides maximum coverage for OAM-message-exchange-based monitoring achieved when the monitored connection is provisioned over inhomogeneous infrastructure. The network management system 210 enables operations management personnel to segment the transport path into sequential OAM compliant segments which support, and OAM non-compliant segments which do not support, conveyance of OAM messages. OAM configuration messages 218 are issued only to OAM compliant path segment endpoints which support conveyance OAM messages.

For monitored connections which have a termination on communications network equipment not managed by the network management system 210, only path segment endpoints on managed communications network equipment are issued OAM configuration commands to operate as OAM message sources or sinks respectively, which provides OAM coverage at least over the portion of the monitored connection provisioned over the managed communications infrastructure.

While the above referenced U.S. patent application provides substantial improvements over the prior art, only unicast connection OAM monitoring is supported.

Ensuring reliable content flow between terminations participating in multicast connection is important in provisioning communications services. Therefore there is a need to solve this issue.

SUMMARY OF THE INVENTION

In accordance with an aspect of the invention, a method of activating the monitoring of a multicast, point-to-multipoint or like connection via exchange of Operations, Administration, and Management (OAM) or similar messages in a communications network management context is provided. A connection record is retrieved from a network management repository in response to an indication of connectivity being extended to a new termination. Common path points in the transport path of the multicast connection are determined. The uncommon portion of the transport path associated with the new termination is optionally segmented. At least one uncommon OAM compliant managed path segment is identified; and OAM configuration commands are issued only to uncommon OAM-compliant path segment endpoints uniquely associated with the new termination to activate OAM functionality.

In the present description, multicast connections can be unidirectional Point-to-MultiPoint (P2 MP) connections, a multitude of unidirectional P2 MP connections being employed in order to establish N-way connectivity between (multiple) N terminations.

In accordance with another aspect of the invention, activating OAM functionality at uncommon managed OAM-compliant path segment endpoints, the method further includes configuring each uncommon managed OAM-compliant path segment endpoint as an OAM message source if path segment endpoint is upstream with respect to the corresponding segment.

In accordance with a further aspect of the invention, activating OAM functionality at uncommon managed OAM-compliant path segment endpoints, the method further includes configuring each uncommon managed OAM-compliant path segment endpoint as an OAM message sink if the path segment endpoint is downstream with respect to the corresponding segment.

In accordance with a further aspect of the invention, the method includes a prior step of receiving a notification of a network event affecting the transport path of the monitored connection.

In accordance with a further aspect of the invention, in segmenting the uncommon portion of the transport path associated with the new termination, the method further includes segmenting the uncommon portion, if the uncommon portion of the transport path is provisioned over OAM functionality non-compliant infrastructure.

In accordance with a further aspect of the invention, in segmenting the uncommon portion of the transport path associated with the new termination, the method further includes segmenting the uncommon portion, if the uncommon portion of the transport path is provisioned via at least one Inter-Carrier Interface (ICI).

In accordance with a further aspect of the invention, in segmenting the uncommon portion of the transport path associated with the new termination, the method further includes segmenting the uncommon portion, if the uncommon portion of the transport path is provisioned over unmanaged communications infrastructure.

In accordance with a further aspect of the invention, activating OAM functionality includes exchange of one of: an OAM Connectivity Checking (OAM-CC) message and an OAM Performance Monitoring (OAM-PM), between an OAM message source and an OAM message sink.

In accordance with a further aspect of the invention, a method of deactivating the monitoring of a unidirectional multicast connection via exchange of OAM messages in a communications network management context is provided. A connection record is retrieved from a network management repository in response to an indication of connectivity being withdrawn from a termination other than a root termination. Common transport path points in the transport path of the connection are determined. Segmentation information concerning at least the uncommon portion of the transport path associated with the termination is extracted from the connection record. At least one uncommon OAM-compliant managed path segment is identified, and OAM configuration commands are issued only to uncommon OAM compliant path segment endpoints uniquely associated with the termination to deactivate OAM functionality.

In accordance with a further aspect of the invention, if the root termination signals its disconnection, OAM functionality is deactivated cyclically, as described in the preceding paragraph, in respect of each termination other than the root termination until only two terminations, including the root remain connected.

In accordance with a further aspect of the invention, a network management system comprising logic performing method steps described above in activating OAM functionality for a managed multicast connection is provided.

In accordance with a further aspect of the invention, a network management system comprising logic performing method steps described above in deactivating OAM functionality for a managed multicast connection is provided.

In accordance with a further aspect of the invention, a connection record tracking information regarding a unidirectional multicast connection is provided. The connection record includes a field storing OAM compliance information in respect of at least one managed connection path point.

In accordance with a further aspect of the invention, the field stores one of: an OAM Connectivity Checking (OAM-CC) compliance, and an OAM Performance Monitoring (OAM-PM) compliance.

In accordance with a further aspect of the invention, the connection record further stores an OAM functionality activation indication only once for common path points irrespective of the number of terminations participating in the multicast connection monitored ensuring storage compactness.

In accordance with yet another aspect of the invention, a network management repository storing at least one connection record is provided.

Advantages are derived from a centralized multicast connection monitoring in configurable in real-time, and a reduced signaling overhead as OAM configuration commands are sent only to relevant uncommon managed path segment endpoints as needed. Further advantages are derived from a compact connection record storing the operational status of OAM functionality only once for common path points even as OAM messages are conveyed to multiple path branch endpoint terminations.

BRIEF DESCRIPTION OF THE DRAWINGS

The features and advantages of the invention will become more apparent from the following detailed description of the exemplary embodiment(s) with reference to the attached diagrams wherein.

It will be noted that in the attached diagrams like features bear similar labels.

DETAILED DESCRIPTION OF THE EMBODIMENTS

For the purposes of the present description, an established point-to-multipoint multicast connection is assumed, and the transport path of the unidirectional point-to-multipoint connection is understood to form a tree. The terminations participating in the point-to-multipoint connection are understood to be part of a multicast group. N-way connectivity is understood to include provisioning (multiple) N unidirectional point-to-multipoint multicast connections defining a single (N) multi-party session.

Figure 1:
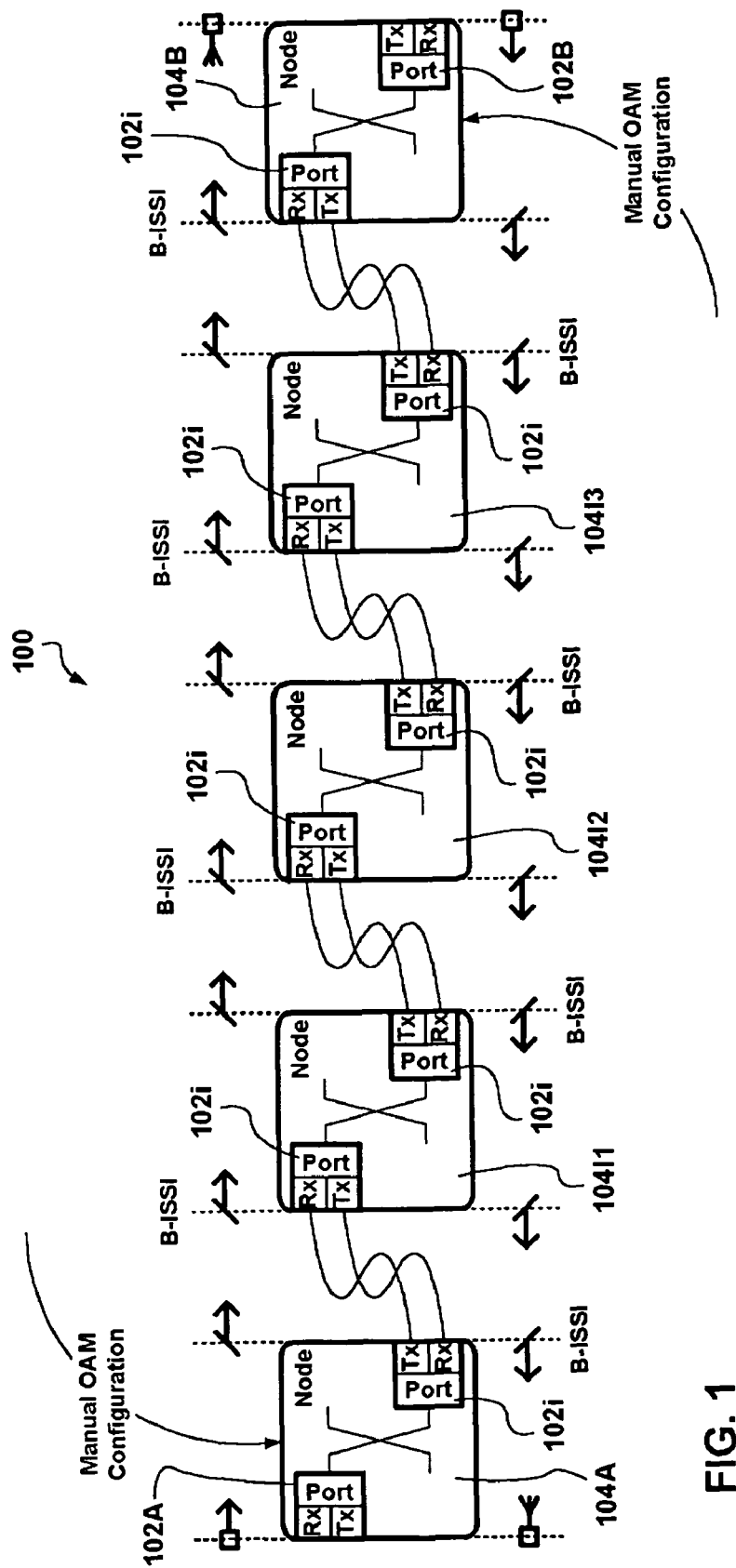
FIG. 1 is a schematic diagram showing communications network infrastructure elements provisioning bi-directional Operations, Administration, and Management (OAM) functionality over a homogeneous standards compliant communications infrastructure for point-to-point unicast content transport.
Figure 2:
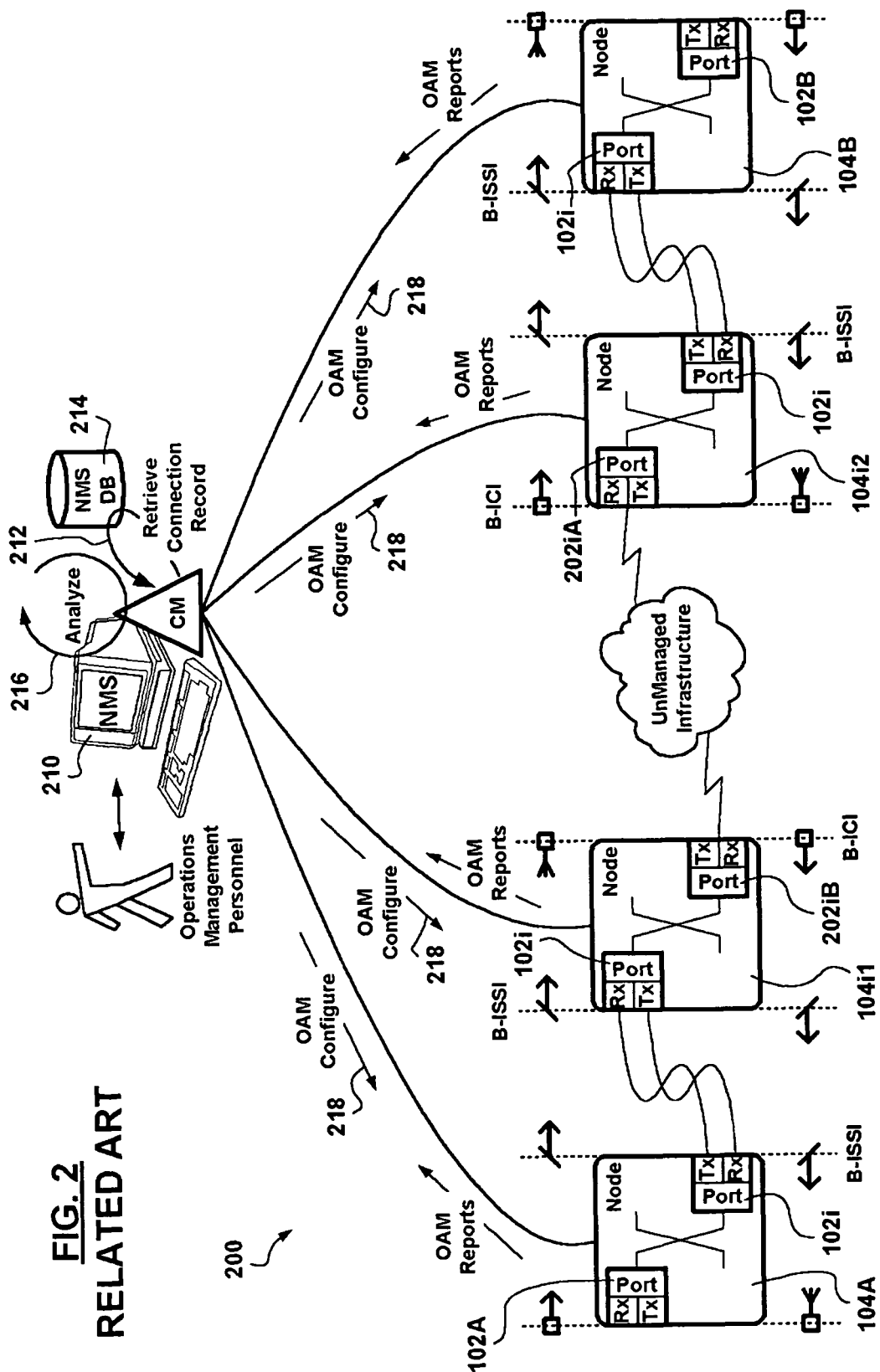
FIG. 2 is a schematic diagram showing communications network infrastructure elements provisioning, in accordance with a prior improvement, bi-directional OAM functionality over an inhomogeneous communications infrastructure for point-to-point unicast content transport.
Figure 3:
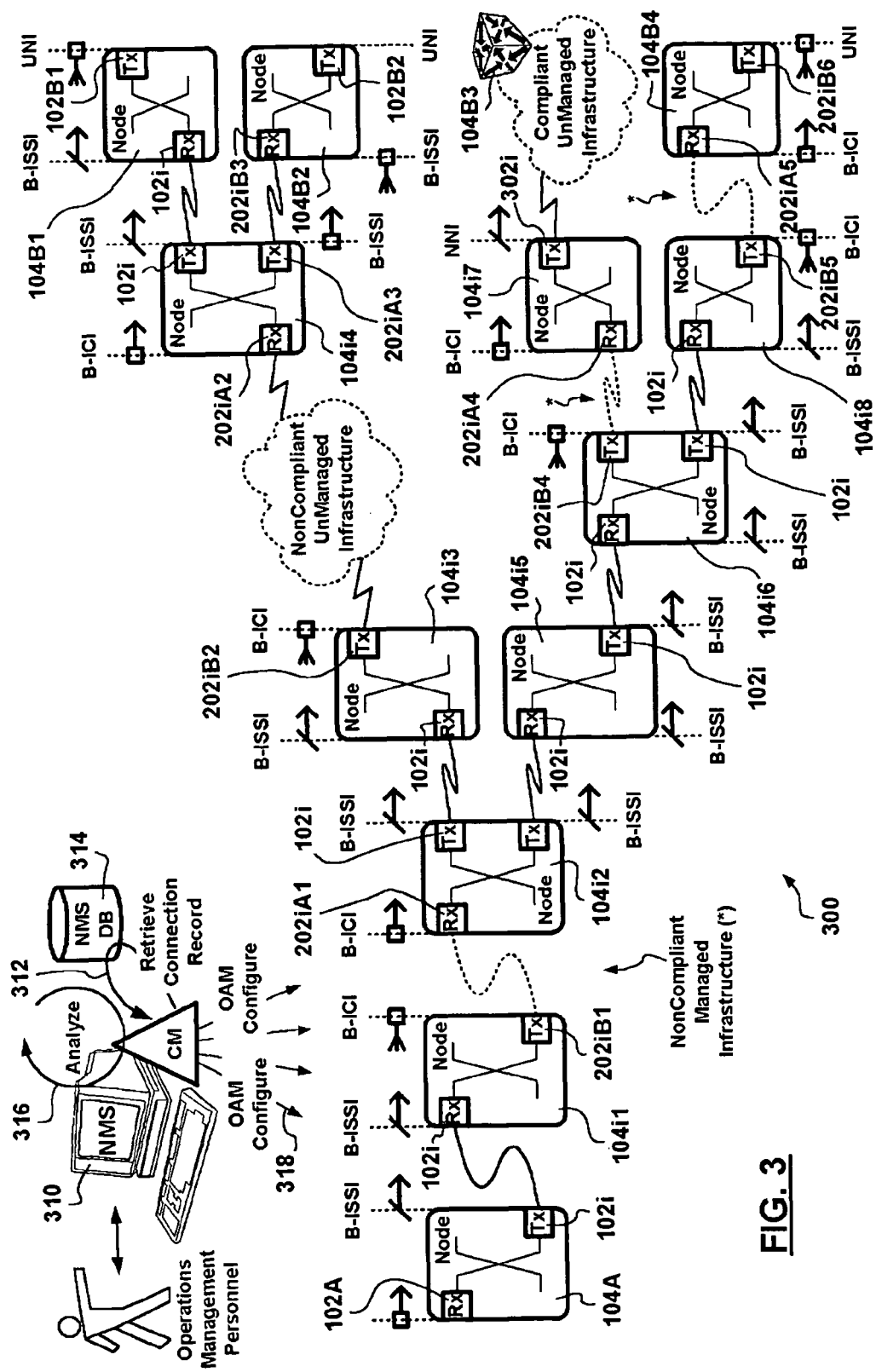
FIG. 3 is a schematic diagram showing communications network infrastructure elements provisioning, in accordance with an exemplary embodiment of the invention, unidirectional OAM functionality over an inhomogeneous communications infrastructure for Point-to-MultiPoint (P2 MP) content transport.

An exemplary such Asynchronous Transfer Mode (ATM) unidirectional point-to-multipoint multicast connection is shown in FIG. 3 between termination root network node 104A and termination branch endpoint network nodes 104B1, 104B2, 104B3, and 104B4. The content flow originates at network node 104A, is conveyed via intermediary network node 104$i$1 to intermediary network node 104$i$2 where it is replicated for conveyance to intermediary network nodes 104$i$3 and 104$i$5. Beyond intermediary network node 104$i$3, the content is conveyed (over an unmanaged infrastructure) to managed intermediary network node 104$i$4. The intermediary network node 104$i$4 replicates the conveyed content for transmission to branch endpoint network nodes 104B1 and 104B2. Beyond intermediary network node 104$i$5, the content is conveyed to intermediary network node 104$i$6 where it is replicated for transmission: via intermediary network node 104$i$7 to branch endpoint network node 104B3, and via intermediary network node 104$i$8 to branch endpoint network node 104B4. It is understood that the connection is exemplary only, an attempt being made to include a variety of use case scenarios for illustrative purposes.

The exemplary infrastructure employed to provision the exemplary connection described above is inhomogeneous in the sense that OAM functionality non-compliant equipment is traversed by the connection. The managed links between intermediary network nodes 104$i$1-104$i$2, 104$i$6-104$i$7, and 104$i$8-104B4 do not support forwarding OAM messages and therefore interface card pairs 202$i$B1/202$i$A1, 202$i$B4/202$i$A4, and 202$i$B5/202$i$A5 on either side of the respective links are Inter-Carrier Interfaces (ICI).

As mentioned above, content is conveyed between intermediary network nodes 104$i$3 and 104$i$4 via unmanaged infrastructure and branch endpoint 104B3 is unmanaged while the unmanaged infrastructure between intermediary network node 104$i$7 and branch endpoint 104B3 is OAM functionality compliant. Each managed branch endpoint interface card 102B1, 102B2 and 102B4 is connected to customer premise equipment representing a User to Network Interface (UNI), while the managed interface card 302$i$ represents a Network-to-Network Interface (NNI).

It is understood that connectivity is provisioned to, and torn down from, terminations joining, or leaving, the multicast group respectively. In accordance with an exemplary embodiment of the invention, for each termination of a multicast group between which a unidirectional point-to-multipoint connection is established, OAM configuration commands, to turn connection monitoring on or off, are sent only to specific terminations joining, or respectively leaving, the multicast group. If the communications network infrastructure is inhomogeneous with respect to OAM functionality support, only partially managed, and/or includes Inter-Carrier Interfaces (ICI); segmentation of the transport path is taken into consideration and OAM configuration commands are only sent to uncommon managed segment path endpoints. If the root node leaves the multicast group, then OAM configuration commands to turn off connection monitoring are sent to the other path branch endpoints, and in the case in which the communications network infrastructure is inhomogeneous, only partially managed and/or includes inter-carrier interfaces, OAM configuration commands to turn off connection monitoring are sent to all compliant managed path segment endpoints.

Making reference to FIG. 3, network management system 310 is employed for managing Point-to-MultiPoint (P2MP) unidirectional multicast connections provisioned over a communications network 300. The above mentioned connectivity information is stored in a network management system database 314, for example, in a connection record which is retrieved 312 by the network management system 310 for analysis 316 whenever communications network events affect the transport path of the monitored connection. The network management system 310 includes logic for performing path analysis 316.

Figure 4:
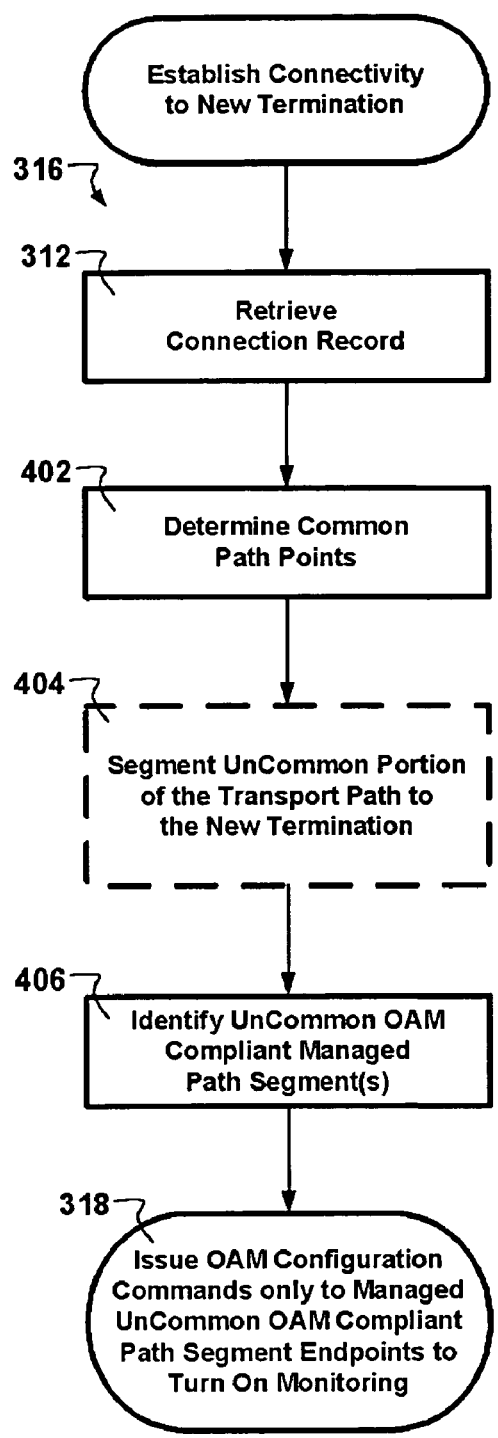
FIG. 4 is a flow diagram showing, in accordance with the exemplary embodiment of the invention, process steps turning on content conveyance monitoring for a termination joining a multicast group.
Figure 5:
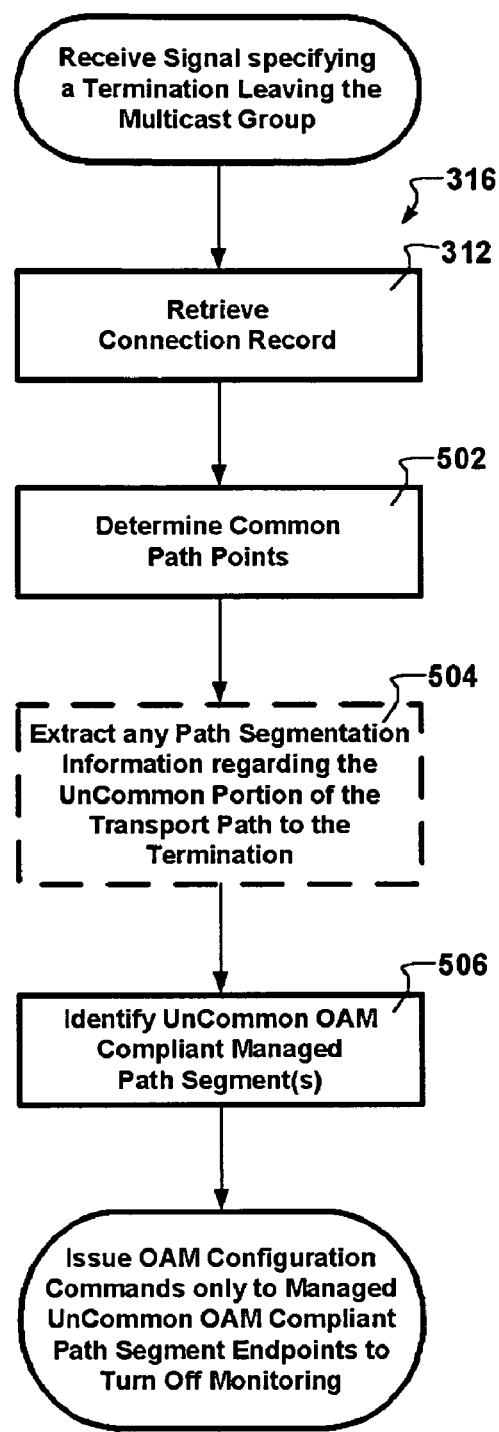
FIG. 5 is a flow diagram showing, in accordance with the exemplary embodiment of the invention, process steps turning off content conveyance monitoring for a termination leaving a multicast group.

In accordance with the exemplary embodiment of the invention, FIG. 4 and FIG. 5 show exemplary method steps performed by the network management system 310 in provisioning point-to-multipoint unidirectional multicast connection monitoring via exchange of OAM messages.

In accordance with the exemplary embodiment of the invention, the transport path tree may be segmented into OAM functionality compliant path segments, as exemplary shown in FIG. 3. The following segments are depicted:

a linear path segment extends from path point 102A to path point 202iB1;

a branched path segment extends from path point 202iA1, branching at intermediary network node 104i2, to path point 202iB2, and branches again at intermediary network node 104i6, to path point 202iB4, further continuing via intermediary network node 104i8 to path point 202iB5;

beyond path point 202iB4, a linear path segment extends from intermediary network node 104i7 into the unmanaged compliant infrastructure towards branch endpoint network node 104B3;

beyond path point 202iB5, a linear path segment extends to the branch endpoint network node 104B4; and beyond path point 202iB2, two linear path segments extend between path points 202iA2 and 102B1, and between path points 202iA3 and 202iB3, respectively.

Attention is drawn to the one of the advantages provided by the exemplary embodiment of the invention wherein, OAM connection monitoring covers the multicast connection to the extent possible, bearing in mind that OAM connection monitoring cannot be provisioned over non-compliant infrastructure managed or not. OAM connection monitoring may be extended (for example, to path branch endpoint 104B3) via compliant unmanaged infrastructure with the assumption that cooperation is established via other means described elsewhere.

Methods described in the above mentioned co-pending U.S. patent application are employed in provisioning connection monitoring via OAM message exchange between the root termination and the first branch endpoint termination to join the multicast group subsequent to the establishment of connectivity therebetween.

In accordance with the exemplary embodiment of the invention, subsequent to connectivity being extended to a subsequent branch endpoint termination joining the multicast group, (see FIG. 4) subsequent to retrieving 312 the connection record of the multicast connection from a network management system repository 314, the transport path analysis method 316 includes:

determining 402 common path points between the root and the new path branch endpoint;

segmenting 404 the uncommon portion of the transport path specific to the new termination, if necessary; and identifying 406 uncommon OAM compliant managed path segment(s).

OAM configuration commands to turn on OAM functionality are issued 318 only to uncommon OAM-compliant path segment endpoints to configure thereof as OAM message sources if upstream with respect to a corresponding segment and to configure thereof as OAM message sinks if downstream with respect to the corresponding segment. A single OAM configuration command is issued to the path branch endpoint associated with the new termination to configure thereof as an OAM messages sink if the communications network infrastructure is compliant and homogenous over the uncommon transport path portion.

Making reference to FIG. 5, subsequent to a termination, other than the root, signaling leaving the multicast group, turning off content conveyance monitoring via OAM message exchange includes analysis 316 steps subsequent to retrieving 312 the connection record from the network management system repository 314:

determining 502 common path points between the root and the path branch endpoint associated with the termination;

extracting 504 any path segmentation information regarding the uncommon portion of the transport path specific to the termination from the connection record; and identifying 506 uncommon OAM compliant managed path segment(s).

OAM configuration commands to turn off OAM functionality are issued 318 only to uncommon OAM-compliant path segment endpoints. A single OAM configuration command is issued to the path branch endpoint associated with the termination leaving the multicast group to turn off OAM functionality there, if the communications network infrastructure is compliant and homogenous over the uncommon transport path portion. Once the connection is reduced to a unicast point-to-point connection, the multicast group including only two terminations, the method of deactivating OAM connection monitoring is described in the above mentioned co-pending U.S. patent application.

If the termination leaving the multicast group is associated with the root path point, the process shown in FIG. 5 is followed for each branch endpoint termination in the multicast group until only two terminations are left in the multicast group, and thereon, the method of deactivating OAM connection monitoring follows steps described in the above mentioned co-pending U.S. patent application. Therefore OAM functionality is deactivated at common path points only as the last two terminations are disconnected. Advantageously, the provisioning status of OAM functionality is stored only once in the connection record for common managed and compliant path points leading to a compact storage record.

Without limiting the invention, multicast connection monitoring may include the exchange of OAM Connectivity Checking (OAM-CC) messages and/or OAM Performance Monitoring (OAM-PM) messages. Without limiting the invention, it is possible for the root termination to be associated with non-compliant infrastructure; although not shown it is understood that connection monitoring coverage starts upstream thereof.

Advantages are derived from a centralized multicast connection monitoring in configurable in real-time, and a reduced signaling overhead as OAM configuration commands are sent only to relevant uncommon managed path segment endpoints as needed. Further advantages are derived from a compact connection record storing the operational status of OAM functionality only once for common path points even as OAM messages are conveyed to multiple path branch endpoint terminations.

The methods described herein provide a simplified provisioning of OAM functionality for multicast connections.

The embodiments presented are exemplary only and persons skilled in the art would appreciate that variations to the above described embodiments may be made without departing from the spirit of the invention. The scope of the invention is solely defined by the appended claims.

We claim:

1. A method of activating monitoring of a unidirectional point-to-multipoint multicast connection, wherein a transport path of the unidirectional point-to-multipoint multicast connection forms a tree that extends from a root to a plurality of branch endpoints, via exchange of Operations, Administration, and Management (OAM) messages in a communications network management context, the method comprising:
    extending connectivity to a new branch endpoint in the tree;
    retrieving, with a network management system (NMS), a connection record from a network management repository, the connection record storing connectivity information for the tree;
    determining common path points in the tree between the root and the new branch endpoint;
    segmenting an uncommon portion of the tree between the root and the new branch endpoint;
    identifying at least one uncommon OAM compliant managed path segment; and
    issuing OAM configuration commands to the at least one uncommon OAM compliant managed path segment uniquely associated with the new branch endpoint to activate an OAM functionality, wherein a provisioning status of the OAM functionality is stored only once in the connection record for common managed and compliant path points in the tree between the root and the new branch endpoint and OAM messages are conveyed to the plurality of branch endpoints.

2. The method claimed in claim 1, wherein activating the OAM functionality at uncommon managed OAM-compliant path segment endpoints, the method further comprises:
    configuring each uncommon managed OAM-compliant path segment endpoint as an OAM message source when the path segment endpoint is upstream in the tree with respect to a corresponding segment relative to the root.

3. The method claimed in claim 1, wherein activating the OAM functionality at uncommon managed OAM-compliant path segment endpoints, the method further comprises:
    configuring each uncommon managed OAM-compliant path segment endpoint as an OAM message sink when the path segment endpoint is downstream in the tree with respect to a corresponding segment relative to the root.

4. The method claimed in claim 1, further comprising:
    receiving a notification of a network event affecting the transport path of the monitored multicast connection.

5. The method claimed in claim 1 further comprises: segmenting the uncommon portion, when the uncommon portion of the transport path is provisioned over an OAM functionality non-compliant infrastructure.

6. The method claimed in claim 1 further comprises: segmenting the uncommon portion, when the uncommon portion of the transport path is provisioned via at least one Inter-Carrier Interface (ICI).

7. The method claimed in claim 1 further comprises: segmenting the uncommon portion, when the uncommon portion of the transport path is provisioned over an unmanaged communications infrastructure.

8. The method claimed in claim 1,
    wherein activating the OAM functionality includes exchange of one of: an OAM Connectivity Checking (OAM-CC) message, and an OAM Performance Monitoring (OAM-PM),
    between an OAM message source and an OAM message sink.

* * * * *